(12) United States Patent
Sugaya et al.

(10) Patent No.: US 6,388,801 B1
(45) Date of Patent: May 14, 2002

(54) OPTICAL AMPLIFICATION APPARATUS UTILIZING RAMAN AMPLIFICATION AND CONTROLLING METHOD THEREOF

(75) Inventors: Yasushi Sugaya, Kawasaki; Tomoto Tanaka, Sapporo; Etsuko Hayashi, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/839,224

(22) Filed: Apr. 23, 2001

Related U.S. Application Data

(63) Continuation of application No. PCT/JP00/05885, filed on Aug. 30, 2000.

(30) Foreign Application Priority Data

Aug. 30, 2000 (JP) .................................. PCT/JP00/05885

(51) Int. Cl.[7] .................................................. H01S 3/00

(52) U.S. Cl. .................................... 359/334; 359/337.4

(58) Field of Search .............................. 359/334, 337.4, 359/337

(56) References Cited

U.S. PATENT DOCUMENTS

| | | | | |
|---|---|---|---|---|
| 6,055,094 A | * | 4/2000 | Shima et al. | 359/341 |
| 6,088,152 A | * | 7/2000 | Berger et al. | 359/334 |

FOREIGN PATENT DOCUMENTS

| | | | |
|---|---|---|---|
| EP | 0 734 105 A2 | 9/1996 | H01S/3/06 |
| EP | 1 018 666 | 7/2000 | |
| JP | 2000-98433 | 4/2000 | |
| JP | 2001-007768 | 12/2001 | H04B/10/17 |

OTHER PUBLICATIONS

Nakagawa et al, 10Gbit/s 285km repeaterless optical transmission experients with a highly sensitive optical preamplifier, 1996, Electronics Letters, vol. 32, pp. 48 and 49.*

Abstract of U.S. Patent 4,401,364, issued Aug. 30, 1983.
Abstract of U.S. Patent 4,616,898, issued Oct. 14, 1986.
Abstract of U.S. Patent 4,805,977, issued Feb. 21, 1989.
P.B. Henson, "Remote Amplification in Optical Transmission Systems" Conference Proceedings. LEOS'97, 10th Annual Meeting. IEEE Lasers and Electro–Optics Society 1997 Annual Meeting, vol. 1, pp. 224–225.

(List continued on next page.)

*Primary Examiner*—Mark Hellner
(74) *Attorney, Agent, or Firm*—Staas & Halsey LLP

(57) ABSTRACT

The present invention aims at providing an optical amplification apparatus for improving noise characteristics by controlling an amplification operation by assuming a noise figure of the overall apparatus and by taking influences of noise light due to Raman amplification into consideration, and a controlling method of the optical amplification apparatus. The optical amplification apparatus according to the present invention comprises first optical amplifying means for Raman amplifying signal light by supplying excitation light to a Raman amplification medium, second amplifying means for amplifying signal light output from the first optical amplifying means, target value setting means for setting a target value that minimizes the noise figure of the overall apparatus as to input light power of the second optical amplifying means, and excitation light controlling means for controlling an excitation light supply condition of the first optical amplifying means in accordance with the target value set by the target value setting means. Consequently, the noise characteristics of the overall apparatus can be optimized by the control inside the own apparatus and excellent noise characteristics can be accomplished.

25 Claims, 6 Drawing Sheets

OTHER PUBLICATIONS

S. Kawai et al., "Wide–Bandwidth and Long–Distance WDM Transmission Using Highly Gain–Flattened Hybrid Amplifier." IEEE Photonics Technology Letter, vol. 11, No. 7, pp. 886–888.

H. Masuda et al. "Wide–band and low noise optical amplification using distributed Raman amplifiers and erbium–doped fiber amplifiers." 24th European Conference on Optical Communication. ECOC'98, vol. 1, pp. 51–52.

K. Rottwitt et al. "Distributed Raman Amplifiers for Long Haul Transmission Systems." Conference Prodeedings. LEO's 98, 11th Annual Meeting, vol. 2, pp. 251–252.

* cited by examiner

OPTICAL AMPLIFICATION APPARATUS UTILIZING RAMAN AMPLIFICATION AND CONTROLLING METHOD THEREOF

This application is a continuation of PCT/JP00/05885 filed on Aug. 30, 2000.

TECHNICAL FIELD

The present invention relates to an optical amplification apparatus for amplifying signal light by utilizing Raman amplification and a controlling method thereof. More particularly, present invention relates to an optical amplification apparatus for achieving the improvement of noise characteristics of the overall optical amplification apparatus by taking influences of noise light generated by Raman amplification into consideration, and a controlling method thereof.

RELATED ART

Demands for information have been increased drastically in recent years with the progress of Internet technologies. A greater capacity and the formation of more flexible networks have been required in a trunk type optical transmission system in which an information capacity is integrated. A WDM optical transmission system for transmitting wavelength division multiplexed (WDM) signal light obtained by multiplexing a plurality of optical signals having different wavelengths is one of the most effective means that can cope with such a system demand. In a conventional WDM optical transmission system, an optical fiber amplifier using an optical fiber doped with a rare earth element such as erbium (Er) is utilized, as an optical repeater. By utilizing broadband characteristics of this optical fiber amplifier, one optical fiber can realizes WDM optical transmission for repeating and transmitting optical signals of a plurality of wavelengths.

To further increase the capacity and to extend the distance and the repeating interval in the WDM optical transmission system as described above, means for compensating for the degradation of S/N in the transmission system becomes necessary. For this purpose, it is effective to use means for supplying excitation light to a transmission path, to perform distributed Raman amplification of the transmission p path by utilizing an amplification operation using the effect of stimulated Raman scattering, so that the repeating loss is equivalently reduced, in addition to an existing optical amplification repeating transmission system.

FIG. 8 is a structural diagram showing the outline of a WDM optical transmission system using distributed Raman amplification, which has been proposed heretofore.

In the WDM optical transmission system in FIG. 8, a transmission path 3 connects a transmission station (Tx) 1 and a reception station (Rx) 2, and a plurality of optical repeaters 4 are arranged on the transmission path 3 with predetermined intervals so that WDM signal light is transmitted and repeated from the transmission station 1 to the reception station 2. Each optical repeater 4 includes an optical amplification apparatus constituted by combining a DRA (Distributed Raman Amplifier) with an EDFA (Erbium-Doped Fiber Amplifier). In this DRA, excitation light for Raman amplification (hereinafter called "Raman excitation light") generated in an excitation light source is supplied through an optical coupler to the transmission path 3 connected to the transmission station side, and the WDM signal light propagated through the transmission path 3 is subjected to distributed Raman amplification. The WDM signal light subjected to the distributed Raman amplification is input to the EDFA, to be amplified to a necessary level, and is again output to the transmission path 3. With such a WDM optical transmission system, since the loss in the transmission path 3 in each repeating segment is decreased due to distributed Raman amplification, transmission characteristics of the WDM signal light can be improved.

Noise characteristics of the optical amplification apparatus constituted by combining the DRA with the EDFA and used for such a WDM optical transmission system are affected not only by the noise figure (NF) of the EDFA but also by noise light generated by the Raman amplification. The noise light resulting from Raman amplification is generated also when only Raman excitation light is incident to an amplification medium under a state where signal light is not input, and is generally called "Raman scattering light due to pumping light". Here, noise light generated in the DRA is called "Amplified Spontaneous Raman Scattering (ASS) light" in contrast with Amplified Spontaneous Emission (ASE) light generated in the EDFA.

To improve the noise characteristics of the optical amplification apparatus and to further improve the transmission characteristics, it is necessary to reduce the noise figure of the overall optical amplification apparatus by taking the influences of ASS light into consideration. To improve the noise characteristics of the optical amplification apparatus, technologies for reducing independently the noise figure of the EDFA have been studied in the past, but specific considerations taking the influences of ASS into account have not been made.

The present invention has been made in view of the problems described above, and it is an object of the present invention to provide an optical amplification apparatus for achieving the improvement of noise characteristics by controlling an amplification operation by assuming a noise figure of an overall optical amplification apparatus while taking influences of noise light resulting from Raman amplification into account, and a controlling method of such an optical amplification apparatus.

DISCLOSURE OF THE INVENTION

To accomplish the object described above, an optical amplification apparatus utilizing Raman amplification according to the present invention comprises: first optical amplifying means for Raman amplifying signal light propagated through a Raman amplification medium by supplying excitation light to the Raman amplification medium; and second optical amplifying means for amplifying the signal light output from the first optical amplifying means, wherein the optical amplification apparatus further comprises: target value setting means for setting a target value for minimizing a noise figure of the overall optical amplification apparatus as to input light power of said second amplifying means; and excitation light controlling means for controlling an excitation light supply condition of the first optical amplifying means in accordance with the target value set by the target value setting means.

According to this construction, input light power of the second optical amplifying means to which Raman amplified signal light is input, is taken into specific consideration, and its target value is set by the target value setting means.

The input light power target value of the second optical amplifying means minimizes the noise figure of the overall optical amplification apparatus constituted by combining the first and second amplifying means. As the excitation light supply condition of the first optical amplifying means is adjusted by the excitation light controlling means in accordance with the set target value, actual input light power of the second optical amplifying means is so controlled as to coincide with the target value. Consequently, the noise characteristics of the overall optical amplification apparatus, that takes the influences of noise light due to Raman amplification into consideration, can be optimized by the control inside its own apparatus, and an optical amplification apparatus having excellent noise characteristics can be realized.

As one aspect of the optical amplification apparatus described above, the target value setting means may include an excitation light power detecting section for detecting excitation light power supplied to the Raman amplification medium, and a computing section for computing noise light power by the first optical amplifying means in accordance with a detection result of the excitation light power detecting section, and setting an input light power target value of the second optical amplifying means for minimizing the noise figure of the overall optical amplification apparatus on the basis of the computed noise light power and on the basis of noise characteristics of the second optical amplifying means.

According to this aspect, in the computing section, the input light power target value of the second optical amplifying means is obtained on the basis of noise light power due to Raman amplification computed in accordance with the power of Raman amplification excitation light detected by the excitation light power detecting section, and on the basis of the noise characteristics of the second optical amplifying means. The excitation light controlling means executes its controlling operation in accordance with this target value.

As another aspect of the optical amplification apparatus described above, the target value setting means may set a maximum value of input dynamic range of the second optical amplifying means to the input light power target value of the second optical amplifying means. Further, in this case, it is preferred that when excitation light power of the first optical amplifying means reaches a maximum value before the input light power of the second optical amplifying means reaches the maximum value of the input dynamic range, the target value setting means sets the input light power target value of the second optical amplifying means so as to correspond to the maximum value of excitation light power of the first optical amplifying means.

According to this aspect, the input light power target value of the second amplifying means is set in the target setting means to the maximum value of the input dynamic range of the second optical amplifying means, and the excitation light controlling means executes its controlling operation in accordance with the target value. At this time, if the excitation light power for Raman amplification reaches the maximum output before the input light power of the second optical amplifying means reaches the maximum value of the input dynamic range, the input light power corresponding to the excitation light power at that point is set as the target value.

The optical amplification apparatus described above may further include input light power detecting means for detecting the input light power of the second optical amplifying means, and the excitation light controlling means may control the excitation light supply condition of the first optical amplifying means so that a detection result of the input light power detecting means coincides with the target value set by the target value setting means. This construction makes it possible to perform a feedback control that keeps the input light power of the second optical amplifying means to be constant at the target value.

As a specific construction of the optical amplification apparatus described above, when the second optical amplifying means includes a plurality of optical amplifying sections connected in parallel with one another, the excitation light controlling means may set an input light power target value corresponding to each of the optical amplifying sections. A specific construction of the second optical amplifying means may include an optical fiber amplifier using a fiber doped with a rare earth element.

With a method of controlling an optical amplification apparatus utilizing Raman amplification according to the present invention, in the optical amplification apparatus comprising: first optical amplifying means for Raman amplifying signal light propagated through a Raman amplification medium by supplying excitation light to the Raman amplification medium; and second optical amplifying means for amplifying the signal light output from the first optical amplifying means, a target value for minimizing a noise figure of the overall optical amplification apparatus as to input light power of the second amplifying means is set and an excitation light supply condition of the first optical amplifying means is controlled in accordance with the target value.

BEST MODE FOR CARRYING OUT THE INVENTION

Embodiments of an optical amplification apparatus utilizing Raman amplification according to the present invention will be explained hereinafter with reference to the accompanying drawings.

Figure 1:
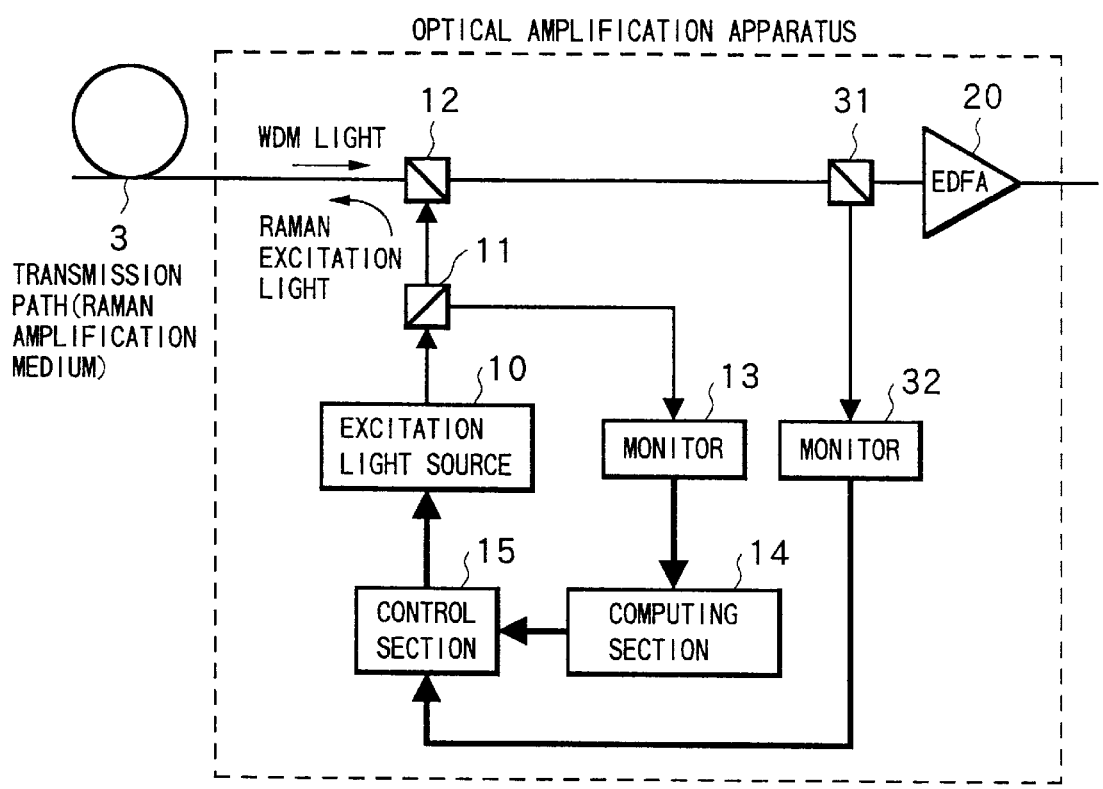
FIG. 1 is a block diagram showing a construction of an optical amplification apparatus according to a first embodiment of the present invention.

FIG. 1 is a block diagram showing the construction of an optical amplification apparatus according to a first embodiment of the present invention.

Referring to FIG. 1, the optical amplification apparatus includes, for example, an excitation power source 10 and an optical coupler 12 as first optical amplifying means, an optical coupler 11 and a monitor 13 as an excitation light power detecting section, a computing section 14, a controlling section 15 as excitation light controlling means, EDFA 20 as second optical amplifying means, and an optical coupler 31 and a monitor 32 as input light power detecting means.

Figure 8:
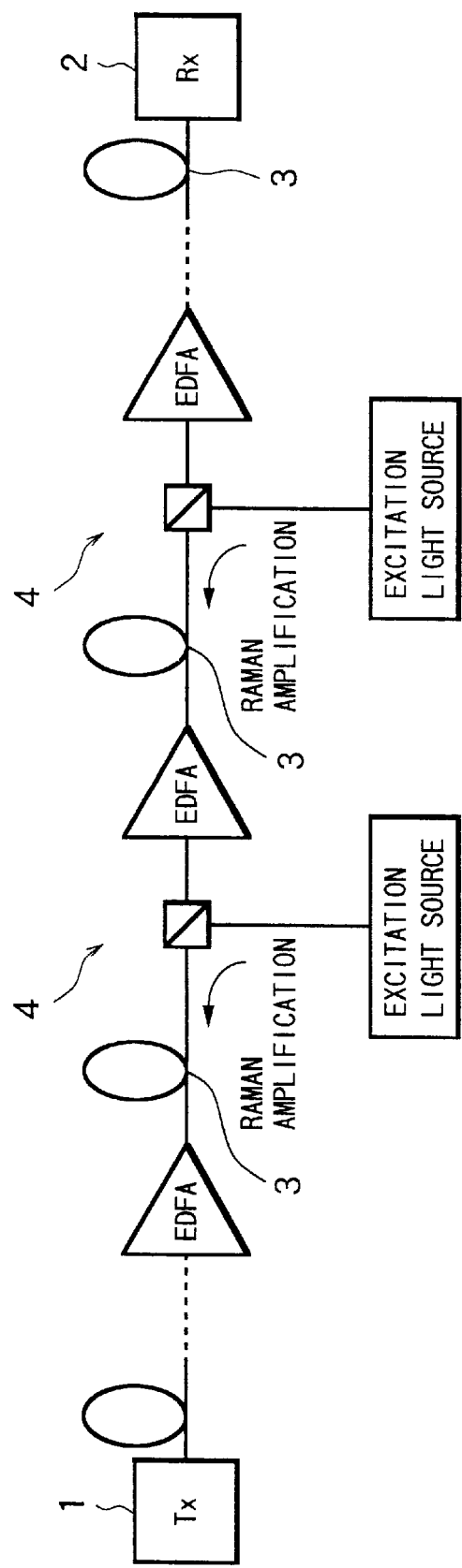
FIG. 8 is a structural diagram showing the outline of a known WDM optical transmission system that utilizes distributed Raman amplification.

The excitation light source 10 generates excitation light for Raman amplification (Raman excitation light) having a wavelength set in advance so as to correspond to a wavelength band of a WDM signal light to be transmitted. This Raman excitation light is supplied to a transmission path 3 through the optical couplers 11 and 12. The transmission path 3 is the same as the transmission path in the WDM optical transmission system shown in FIG. 8. The optical coupler 11 branches a part of Raman excitation light output from the excitation light source 10 and transmits it to the monitor 13. The optical coupler 12 supplies the Raman excitation light having passed through the optical coupler 11 from a signal light input terminal to the transmission path 3 and passes therethrough the WDM signal light from the transmission path 3 to transmit to the EDFA side 20. Here, the Raman excitation light is propagated in an opposite direction to the WDM signal light, and the transmission path 3 connected to the signal light input terminal serves as a Raman amplification medium. In this way a distributed Raman amplifier (DRA) is constituted, in which the WDM signal light propagated through the transmission path 3 is Raman amplified.

The monitor 13 monitors power of Raman excitation light output from the excitation light source 10 on the basis of branched light of the optical coupler 11, and outputs a monitoring result to the computing section 14. The computing section 14 computes total power of amplified spontaneous Raman scattering light (ASS light) as a noise component due to Raman amplification, sets a target value of input light power to EDFA 20, that minimizes a noise figure (NF) of the overall apparatus, and outputs this target value to the controlling section 15. Incidentally, a specific method of setting the target value in the computing section 14 will be explained later. The controlling section 15 adjusts a driving condition of the excitation light source 10 in accordance with the target value set by the computing section 14 and the monitoring result of the monitor 32, to control such as the power of Raman excitation light supplied to the transmission path 3.

The EDFA 20 is an EDFA having a general construction that amplifies a WDM signal light having passed through the optical couplers 12 and 31 to a required level and then outputs this amplified light. This EDFA 20 has characteristics such that its noise figure is changed in accordance with input light power. Information about the noise characteristics of this EDFA 20 is assumed to be stored in advance in the computing section 14 or to be transferred at an appropriate timing. Incidentally, the second optical amplifying means of the present invention is not limited to the EDFA, but may be an optical fiber amplifier doped with a rare earth element other than erbium or a Raman amplifier.

The optical coupler 31 branches a part of WDM signal light input to the EDFA 20 described above and transmits branched light to the monitor 32. The monitor 32 monitors input light power of the EDFA 20 on the basis of the branched light from the optical coupler 31 and outputs its monitoring result to the controlling section 15.

Next, the operation of the first embodiment will be explained.

First, a specific explanation will be made on the setting process of the target value executed in the computing section 14 of the present optical amplification apparatus.

Figure 2:
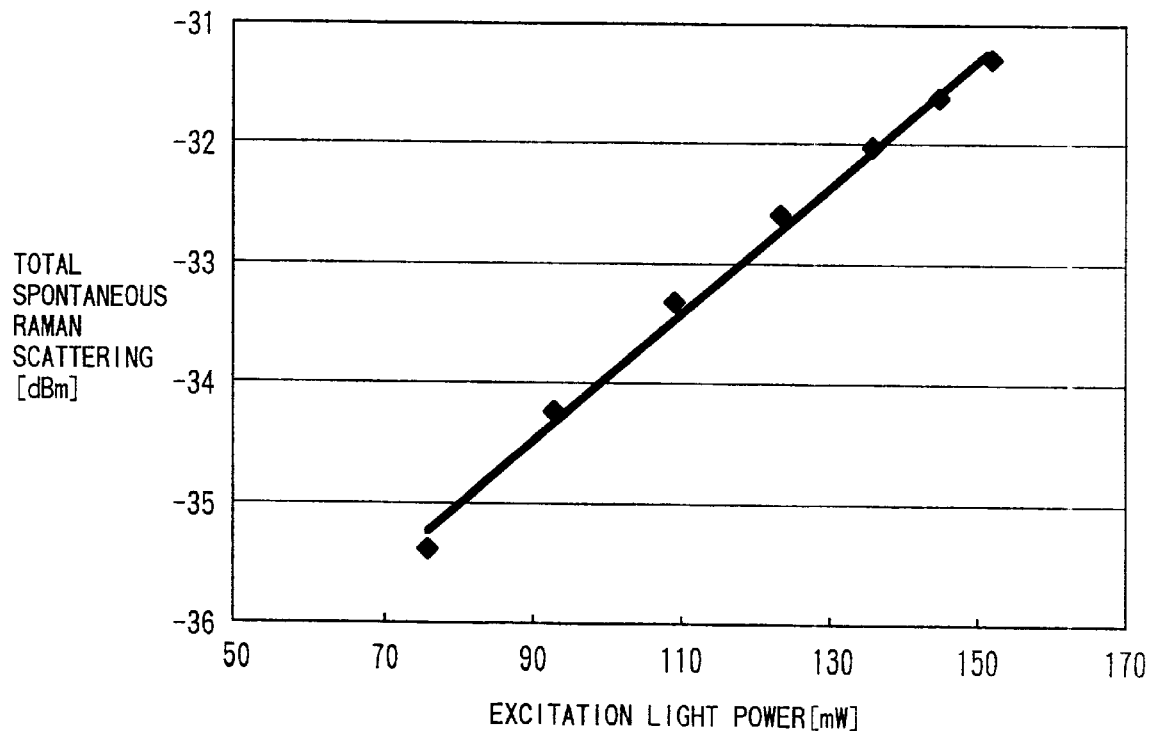
FIG. 2 is a diagram showing a relation between total power of noise components (ASS light) generated by Raman amplification and power of Raman excitation light.

In the computing section 14, total power of ASS light is computed on the basis of the Raman excitation light power as described above. It has been confirmed experimentally that total power of ASS light (noise component) generated due to Raman amplification is changed with respect to power of Raman excitation light in accordance with the relation shown in FIG. 2, for example. When this relation is expressed by a numeric formula by using true values, total power Ass [mW] of ASS light can be expressed by the following equation (1):

$$Ass = m_1 \cdot 10^{\frac{a_{11} \cdot Pu_1 + a_{10}}{10}} + m_2 \cdot 10^{\frac{a_{21} \cdot Pu_2 + a_{20}}{10}} + \cdots + m_i \cdot 10^{\frac{a_{i1} \cdot Pu_i + a_{i0}}{10}} \quad (1)$$

where $Pu_1$ to $Pu_i$ represent Raman excitation power [mW] generated in each excitation light source when i numbers of excitation light sources for Raman amplification, having mutually different wavelengths, are disposed (i=1 in this embodiment), $m_1$ to $m_i$ represent a weighting constant corresponding to each excitation light source, and $a_{i1}$, $a_{i0}$ to $a_{i1}$, $a_{i0}$ represent constants (calculation coefficients) when the relation shown in FIG. 2 is approximated by a linear function. Although the relation between the total power of ASS light and the power of Raman excitation light are herein approximated by the linear function, approximation can be made by functions of the second and higher degrees, to improve accuracy.

When the total power Ass of ASS light is computed by using the Raman excitation power measured by the monitor 13 in accordance with the relational formula (1), next, the input light power target value of the EDFA 20, that minimizes the noise figure of the overall optical amplification apparatus constituted by combining the DRA and the EDFA, is obtained.

When the noise figure of the overall optical amplification apparatus is considered, it is possible to define the noise figure of the DRA in the following way and then to calculate the noise figure of the overall apparatus on the basis of this DRA noise figure and the noise characteristics of the EDFA that are stored in advance.

Figure 3:
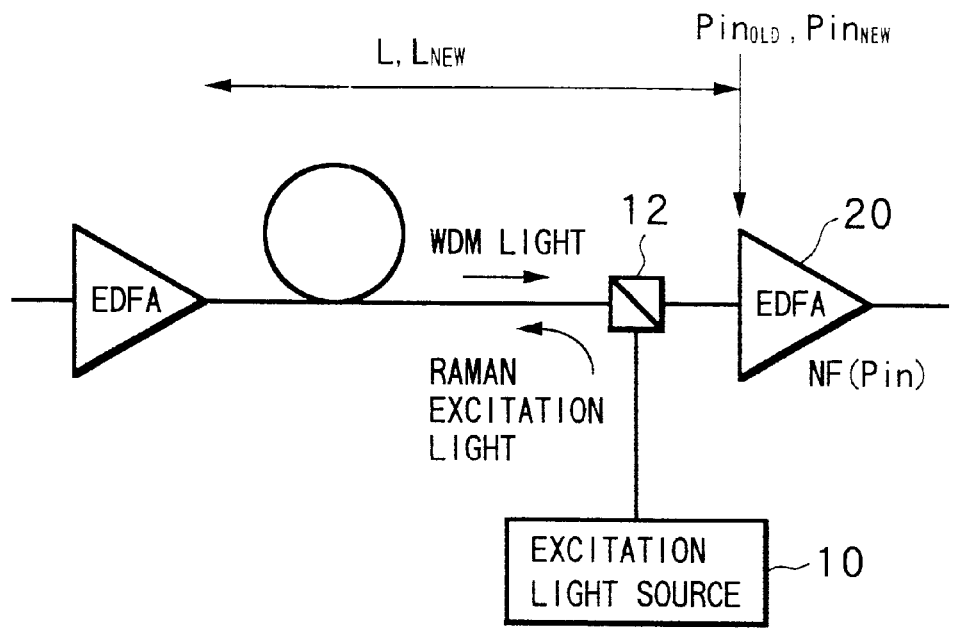
FIG. 3 is a conceptual view for explaining an operation of a computing section in the first embodiment of the present invention.
Figure 4:
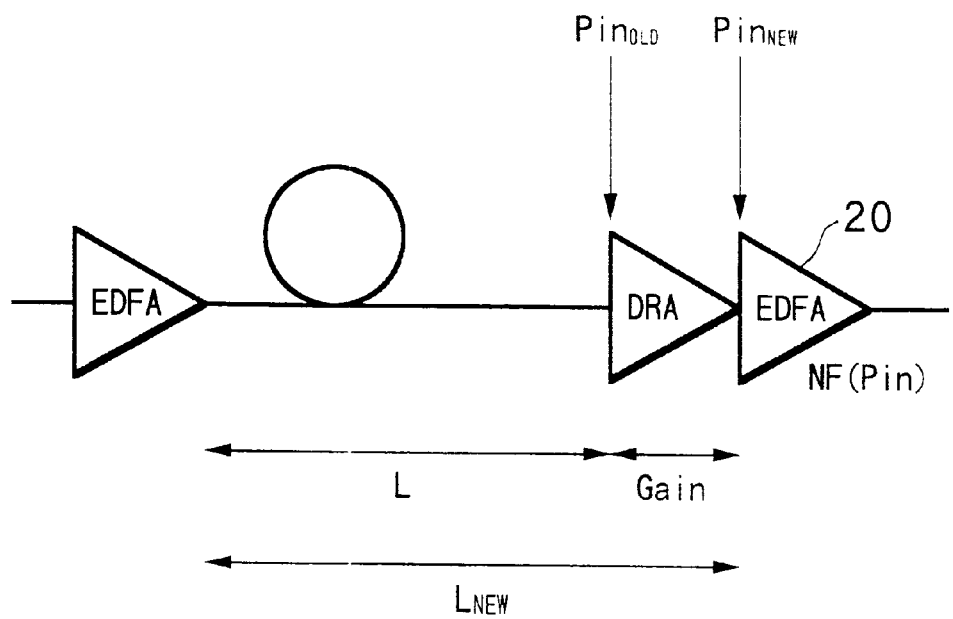
FIG. 4 is a view of a virtual construction for explaining the operation of the computing section in the first embodiment of the present invention.

It can be considered that in the optical amplification apparatus constituted by combining the DRA and the EDFA, pumping of Raman excitation light output from the excitation light source 10 changes the loss of transmission path 3 from L to $L_{NEW}$ and the input light level of the EDFA 20 from $Pi_{OLD}$ to $Pi_{NEW}$ as shown in the conceptual view of FIG. 3. If a gain of the DRA is Gain at this time, Gain can be expressed as Gain=$L/L_{NEW}$ or Gain=$Pi_{NEW}/Pi_{OLD}$. Therefore, an amplifier block is herein assumed, that has a DRA having the Raman gain Gain described above and a noise figure $NF_{DRA}$ resulting from generation of ASS light. An optical amplification apparatus having a virtual construction shown in FIG. 4 is assumed, too. A noise figure $NF_{DRA+EDFA}$ of the overall apparatus is thus derived.

Generally, a noise figure $NF_{DRA(OFF)}$ of the DRA when Raman excitation light is OFF can be expressed by the following equation (2), and a noise figure $NF_{DRA(ON)}$ of the DRA when Raman excitation light is ON can be expressed likewise by the following equation (3):

$$NF_{DRA(OFF)} = L \quad (2)$$

$$NF_{DRA(ON)} = \{P_{ASS}/(h \cdot v \cdot \Delta f) + 1\} \cdot L_{NEW} \quad (3)$$

where L represents the loss of transmission path when excitation light is OFF, and $L_{NEW}$ represents the loss of transmission path when excitation light is ON. Symbol h represents the Planck's constant, v is a wavelength and $\Delta f$ is a filter band (for example, 10 GHz). $P_{ASS}$ is a value obtained by converting the total power Ass of ASS light calculated by the equation (1), to resolution (for example, 10 GHz) corresponding to a noise figure $NF_{EDFA}$ of the EDFA to be used for subsequent computation, in the unit of dBm.

Here, when a degradation amount of the noise figure due to pumping of the DRA is taken into consideration, a virtual noise figure $NF_{DRA}$ of the DRA can be defined. This $NF_{DRA}$ can be expressed by the following equation (4) from the relation of the equations (2) and (3) given above:

$$NF_{DRA} = NF_{DRA(ON)} / NF_{DRA(OFF)} \quad (4)$$

$$= \frac{P_{ASS}/(h \cdot v \cdot \Delta f) + 1}{Gain}$$

Next, the noise figure of the overall apparatus constituted by combining the DRA and the EDFA is considered. A noise figure $NF_{DRA+EDFA(OFF)}$ of the overall apparatus when Raman excitation light is OFF can be expressed by the following equation (5), and a noise figure $NF_{DRA+EDFA(ON)}$ of the overall apparatus when Raman excitation light is ON can be expressed by the following equation (6):

$$NF_{DRA+EDFA(OFF)} = L \cdot NF_{EDFA}(Pi_{OLD}) \quad (5)$$

$$NF_{DRA+EDFA(ON)} = L \cdot \left( NF_{DRA} + \frac{NF_{EDFA}(Pi_{NEW}) - 1}{Gain} \right) \quad (6)$$

where $NF_{EDFA}(Pi_{OLD})$ represents the noise figure of the EDFA at input light power $Pi_{OLD}$ when excitation light is OFF, and $NF_{EDFA}(Pi_{NEW})$ represents the noise figure of the EDFA at input light power $Pi_{NEW}$ when excitation light is ON.

Here, a virtual noise figure $NF_{DRA+EDFA}$ of the overall apparatus can be defined in the same way as when the virtual noise figure $NF_{DRA}$ of the DRA is considered. This $NF_{DRA+EDFA}$ can be expressed by the following equation (7) from the relation of the equations (4) to (6).

$$NF_{DRA+EDFA} = NF_{DRA+EDFA(ON)} / NF_{DRA+EDFA(OFF)} \quad (7)$$

$$= \frac{P_{ASS}/(h \cdot v \cdot \Delta f) + NF_{EDFA}(Pi_{NEW})}{NF_{EDFA}(Pi_{OLD}) \cdot Gain}$$

The relation of the equation (7) can be converted to a logarithmic value, to be expressed by the following equation (7)'. However, it utilizes the relation $Gain=Pi_{NEW}/Pi_{OLD}$.

$$NF_{DRA+EDFA[dB]} = 10 \cdot \log\{P_{ASS}/(h \cdot v \cdot \Delta f) + NF_{EDFA}(Pi_{NEW})\} - \quad (7)'$$

$$NF_{EDFA[dB]}(Pi_{OLD}) - (Pi_{NEW[dB]} - Pi_{OLD[dB]})$$

In the equation (7)' given above, $Pi_{OLD}$ and $NF_{EDFA[dB]}(Pi_{OLD})$ are fixed values. Therefore, to minimize a value of the noise figure $NF_{DRA+EDFA[DB]}$ of the overall apparatus, a value of the following equation (8) may be minimized.

$$\frac{P_{ASS}/(h \cdot v \cdot \Delta f) + NF_{EDFA}(Pi_{NEW})}{Pi_{NEW}} \quad (8)$$

Accordingly, input light power $Pi_{NEW}$ that makes the value of the equation (8) minimal is obtained by using ASS light power $P_{ASS}$ calculated from the equation (1), and this input light power $Pi_{NEW}$ is set to the input light power target value of the EDFA 20. In this way, the noise figure of the overall apparatus can be minimized.

Figure 5:
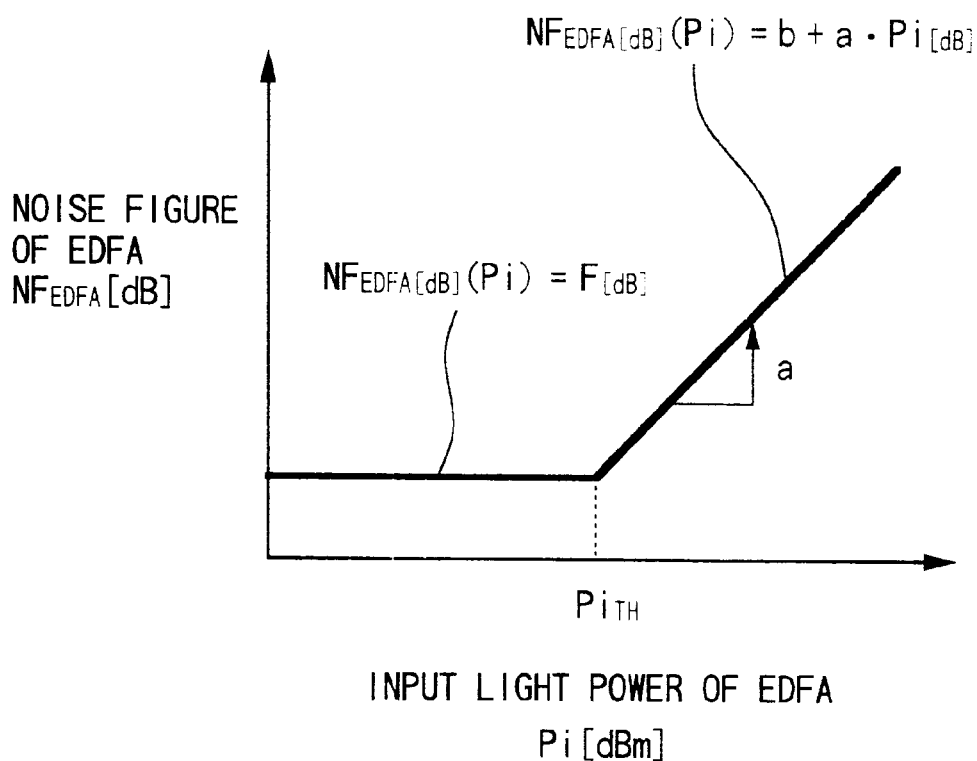
FIG. 5 is a diagram showing dependence of a noise figure of EDFA on input light power in the first embodiment of the present invention.

It is known that the noise figure $NF_{EDFA}$ of the EDFA generally has dependence on input light power Pi as shown in FIG. 5. In other words, the noise figure $NF_{EDFA}$ of the EDFA has dependence such that it remains substantially constant when input light power Pi of the EDFA is a boundary value $Pi_{TH}$ or less, and increases when input light power Pi exceeds the boundary value $Pi_{TH}$. This input light power dependence of the noise figure $NF_{EDFA}$ can be numerically formulated as expressed by the following equation (9), for example:

When $Pi \leq Pi_{TH}$, $NF_{EDFA}(Pi) = F$ (9)

When $Pi > Pi_{TH}$, $NF_{EDFA}(Pi) = b \cdot Pi^a$ $$NF_{EDFA[dB]}(Pi) = b + a \cdot Pi_{[dB]}$$

where F, a and b are constants, and when $Pi=Pi_{TH}$, $NF_{EDFA}(Pi_{TH})=F=b \cdot (Pi_{TH}^a)$.

The input light power target value $Pi_{NEW}$ that minimizes the value of the equation (8) can be concretely set in the following way, for example, by taking the relation of the formula (9) into consideration.

When the input light power $Pi_{NEW}$ to the EDFA 20 is sufficiently a small value ($Pi \leq Pi_{TH}$), $NF_{EDFA}(Pi)$ is constant. Therefore, the noise figure of the overall apparatus can be minimized by setting $Pi_{NEW}$ as the denominator to the greatest possible value in the equation (8). In other words, the optimum condition can be accomplished when the input light power $Pi_{NEW}$ to the EDFA is the greatest.

When the input light power $Pi_{NEW}$ to the EDFA 20 is sufficiently a great value ($Pi>Pi_{TH}$), on the other hand, the equation (9) is substituted for the equation (8) to give the following modified equation (8)'.

$$\frac{P_{ASS}/(h \cdot v \cdot \Delta f) + b \cdot Pi_{NEW}^a}{Pi_{NEW}} = \frac{P_{ASS}/(h \cdot v \cdot \Delta f)}{Pi_{NEW}} + b \cdot Pi_{NEW}^{a-1} \quad (8)'$$

When $a \leq 1$ in the equation (8)' given above, that is, when an NF slope of the EDFA 20 does not exceed 1 dB/dB, the noise figure of the overall apparatus can be reduced to minimum by setting the input light power $Pi_{NEW}$ to the greatest possible value. When $a>1$, that is, when the NF slope exceeds 1 dB/dB, the noise figure of the overall apparatus can be reduced to minimum by inversely calculating the value of $Pi_{NEW}$ when the value of the equation (8)' described above becomes minimal.

Incidentally, the cases about the equation (8)' are classified by judging whether or not the NF slope (value of a) exceeds 1 dB/dB. However, the classification of the cases is not strictly limited to 1 dB/dB, but may be set depending on whether or not the noise figure of the EDFA can be substantially improved with respect to the increase in input light power $Pi_{NEW}$.

When the computing section 14 sets the input light power target value of the EDFA 20 in this way, the target value is transmitted to the controlling section 15. The controlling section 15 adjusts the driving condition of the excitation light source 10 so that the input light power of the EDFA 20 coincides with the target value from the computing section 14, thereby controlling automatically the Raman excitation light power. Here, the monitoring result of the monitor 32, that measured actual input light power to the EDFA 20, is transmitted to the controlling section 15, and the controlling section 15 executes a feedback control for making the input light power to the EDFA 20 reliably constant at the target value. However, when the relation of the input light power value of the EDFA 20 with respect to the driving condition of the excitation light source 10 is clarified in advance, this feedback control may be omitted.

Since a power level of the WDM signal input to the EDFA 20 is automatically controlled in this way to the target value set by the computing section 14 by adjusting the supply condition of Raman excitation light, the noise figure of the overall optical amplification apparatus constituted by combining the DRA and the EDFA becomes minimal. In consequence, the noise characteristics of the optical amplification apparatus can be optimized through the control made inside its own apparatus, to realize an optical amplification apparatus utilizing Raman amplification having excellent noise characteristics. When such an optical amplification apparatus is employed to construct an optical transmission system shown in FIG. 8, the improvement of the transmission characteristics by distributed Raman amplification can be independently optimized and adjusted at each node. This effect is particularly advantageous, since it enables to take flexible counter-measure for such a situation where variance of the loss of transmission path fiber is great or where this optical amplification apparatus is installed at a repeating stage inside an optical network through optical ADM or an optical cross-connect node and its installation environment is likely to fluctuate, for example,.

Incidentally, in the first embodiment described above, ASS light power is computed by using the monitoring result of Raman excitation light and the input light power target value to the EDFA 20 is set so that the value of the equation (8) finally becomes minimal. However, the method of setting the input light power target value of the EDFA 20 in the present invention is not limited to this method.

For example, when the NF slope of the EDFA is 1 dB/dB or less (when $a \leq 1$ in the equation (9); a general EDFA is often expected to operate at the NF slope of not greater than 1 dB/dB), the noise figure of the overall apparatus can be reduced to minimum when the input light power $Pi_{NEW}$ of the EDFA 20 is set to the greatest possible value without particularly conducting the calculation as is made in the first embodiment. This means that a maximum value of input dynamic range of the EDFA is set as the input light power target value of the EDFA. However, when the pump power limit is reached before the input light power of the EDFA reaches the maximum value of input dynamic range, that is, when the power of Raman excitation light output from the excitation light source reaches the maximum value, the input light power of the EDFA corresponding to the Raman excitation light power at that point is set as the target value.

Next, a second embodiment of the present invention will be explained. In the second embodiment, consideration will be made on an optical amplification apparatus suitable for a WDM optical communication system in which so-called "C band" WDM signal light having a wavelength band of 1,550 nm and so-called "L band" WDM signal light having a wavelength band of 1,580 nm, for example, are collectively transmitted.

Figure 6:
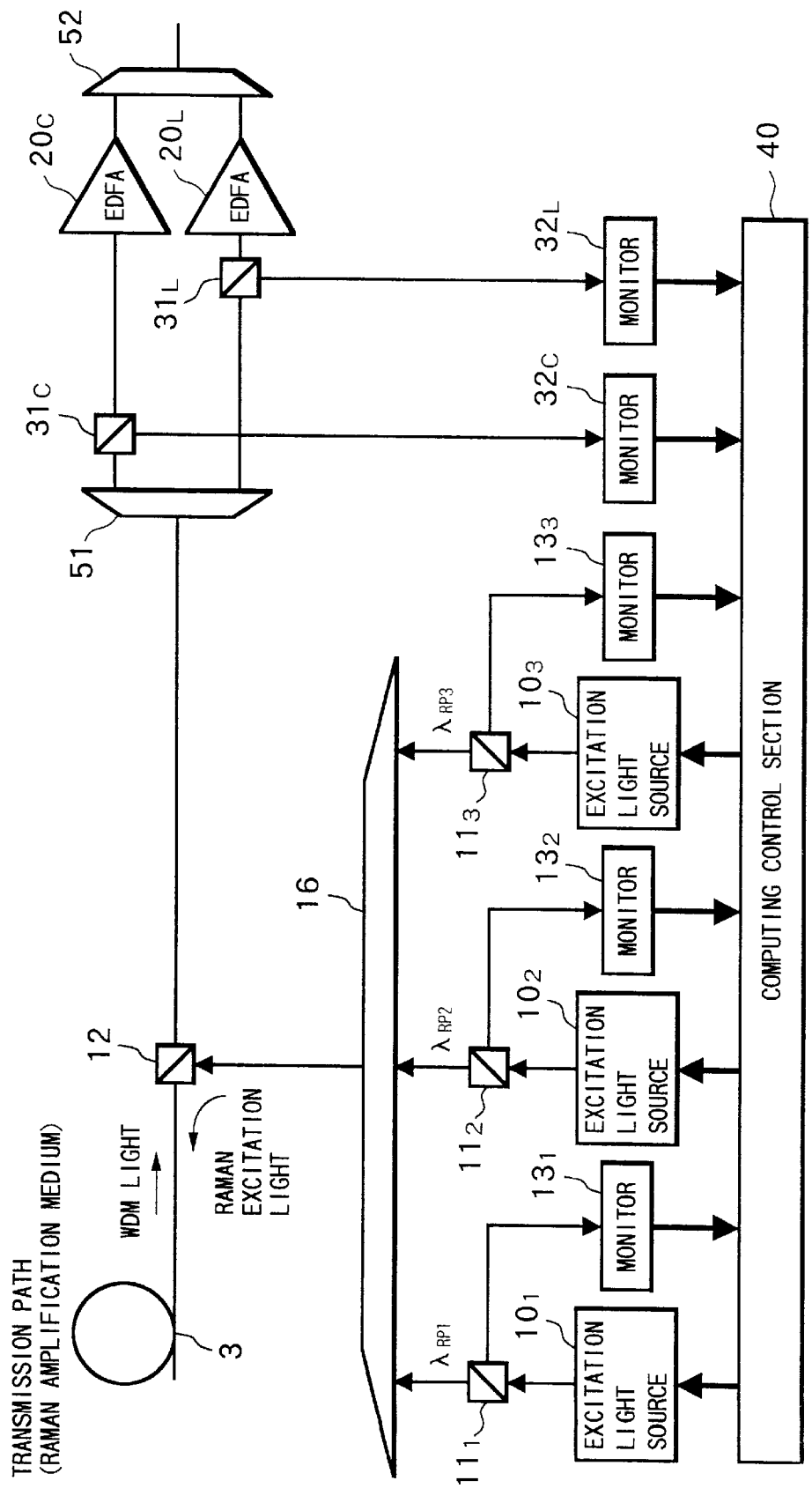
FIG. 6 is a block diagram showing a construction of an optical amplification apparatus according to a second embodiment of the present invention.

FIG. 6 is a block diagram showing the construction of the optical amplification apparatus according to the second embodiment. Like reference numerals are used in this figure to identify like constituent portions as in the first embodiment shown in FIG. 1.

In FIG. 6, the construction of this optical amplification apparatus different from that of the first embodiment resides in the following points. A first different point is that a plurality (three in the figure, for example) of excitation light sources $10_1$ to $10_3$ having mutually different wavelengths are provided in this embodiment. Wavelengths $\lambda_{RP1}$ to $\lambda_{RP3}$ generated by these excitation light sources $10_1$ to $10_3$ are multiplexed by a WDM coupler 16, an d then supplied to a transmission path 3 through an optical coupler 12. A part of Raman excitation light having each wavelength $\lambda_{RP1}$ to $\lambda_{RP3}$ generated by each excitation light source $10_1$ to $10_3$ is branched by each optical coupler $11_1$ to $11_3$ and is monitored by each monitor $13_1$ to $13_3$. Each monitoring result is sent to a computing controlling section 40. A sec on d different point pertains to the construction on the EDFA side. Namely, the EDFA side is constructed corresponding to the C band and the L band , respectively. The constructions other than the constructions described above are the same as those of the first embodiment.

More particularly, the construction on the EDFA side includes a WDM coupler 51 for demultiplexing WDM signal light having passed through the optical coupler 12 to the C band and the L band, a C band EDFA $20_C$ for amplifying WDM signal light of the C band demultiplexed by the WDM coupler 51, an L band EDFA $20_L$ for amplifying WDM signal light of the L band demultiplexed by the WDM coupler 51, and a WDM coupler 52 for multiplexing output light of the C band EDFA $20_C$ and output light of the L band EDFA $20_L$, to output to the transmission path. Here, optical couplers $31_C$ and $31_L$ are interposed between the WDM coupler 51 and the C band EDFA $20_C$ and between the WDM coupler 51 and the L band EDFA $20_L$, respectively. Monitors $32_C$ and $32_L$ monitor input light power of the C band EDFA $20_C$ and input light power of the L band EDFA $20_L$, respectively, and each monitoring result is sent to a computing controlling section 14. Incidentally, the computing controlling section 40 is assembled by gathering the computing section 14 and the controlling section 15 in the first embodiment into one block, and exhibits the same functions of these computing section 14 and controlling section 15.

In the optical amplification apparatus having the construction described above, Raman excitation light having three wavelengths $\lambda_{RP1}$ to $\lambda_{RP3}$ set in advance so as to correspond to the C band the L band are multiplexed the WDM coupler 16, and then multiplexed light is supplied to the transmission path 3 through the optical coupler 12. At this time, a part of Raman excitation light of each wavelength is branched by the optical coupler $11_1$ to $11_3$ and is sent to each monitor $13_1$ to $13_3$. Each monitor $13_1$ to $13_3$ monitors Raman excitation light power of each wavelength, and outputs the monitoring result to the computing controlling section 40.

The computing controlling section 40 computes total power $Ass_C$, $Ass_L$ of ASS light of each band by using the Raman excitation light power of each wavelength in accordance with the following equations ($1_C$) and ($1_L$). Incidentally, the equations ($1_C$) and ($1_L$) represent an example of the relational formulas of when the number i of the excitation light sources for Raman amplification is 3 in the afore-mentioned equation (1), the influences of inter-pump Raman are taken into consideration, and the relation between total power of ASS light and power of Raman excitation light is approximated by the quadratic function to improve accuracy.

$$Ass_C = cm_1 \cdot 10^{\frac{cd_2 \cdot (cp_1 \cdot Pu_1)^2 + cd_1 \cdot (cp_1 \cdot Pu_1 - d_{12} \cdot cp_1^2 \cdot Pu_1^2 \cdot cp_2 \cdot Pu_2 - d_{31} \cdot cp_3 \cdot Pu_3 \cdot cp_1^2 \cdot Pu_1^2) + cd_0}{10}} + \qquad (1_C)$$

$$cm_2 \cdot 10^{\frac{cd_2 \cdot (cp_2 \cdot Pu_2)^2 + cd_1 \cdot (cp_2 \cdot Pu_2 - d_{23} \cdot cp_2^2 \cdot Pu_2^2 \cdot cp_3 \cdot Pu_3 + d_{12} \cdot cp_1 \cdot Pu_1 \cdot cp_2^2 \cdot Pu_2^2) + cd_0}{10}} +$$

$$cm_3 \cdot 10^{\frac{cd_2 \cdot (cp_3 \cdot Pu_3)^2 + cd_1 \cdot (cp_3 \cdot Pu_3 + d_{31} \cdot cp_3^2 \cdot Pu_3^2 \cdot cp_1 \cdot Pu_1 + d_{23} \cdot cp_2 \cdot Pu_2 \cdot cp_3^2 \cdot Pu_3^2) + cd_0}{10}}$$

$$Ass_L = lm_1 \cdot 10^{\frac{ld_2 \cdot (lp_1 \cdot Pu_1)^2 + ld_1 \cdot (lp_1 \cdot Pu_1 - d_{12} \cdot lp_1^2 \cdot Pu_1^2 \cdot lp_2 \cdot Pu_2 - d_{31} \cdot lp_3 \cdot Pu_3 \cdot lp_1^2 \cdot Pu_1^2) + ld_0}{10}} + \qquad (1_L)$$

$$lm_2 \cdot 10^{\frac{ld_2 \cdot (lp_2 \cdot Pu_2)^2 + ld_1 \cdot (lp_2 \cdot Pu_2 - d_{23} \cdot lp_2^2 \cdot Pu_2^2 \cdot lp_3 \cdot Pu_3 + d_{12} \cdot lp_1 \cdot Pu_1 \cdot lp_2^2 \cdot Pu_2^2) + ld_0}{10}} +$$

$$lm_3 \cdot 10^{\frac{ld_2 \cdot (lp_3 \cdot Pu_3)^2 + ld_1 \cdot (lp_3 \cdot Pu_3 + d_{31} \cdot lp_3^2 \cdot Pu_3^2 \cdot lp_1 \cdot Pu_1 + d_{23} \cdot lp_2 \cdot Pu_2 \cdot lp_3^2 \cdot Pu_3^2) + ld_0}{10}}$$

Where $Pu_1$ to $Pu_3$ are Raman excitation light power generated in the excitation light sources, $cm_1$ to $cm_3$ and $lm_1$ to $lm_3$ are weighting coefficients, $cd_0$ to $cd_2$ and $ld_0$ to $ld_2$ are calculation coefficients, $cp_1$ to $cp_3$ and $lp_1$ to $lp_3$ are effective pump coefficients, and $d_{12}$, $d_{23}$ and $d_{31}$ are inter-pump Raman coefficients, respectively.

After the ASS light total power $Ass_C$ and $Ass_L$ of the C band and the L band are calculated, the setting process of input light power target value of the EDFA is performed in the same way as in the first embodiment. Here, the C band EDFA $20_C$ and the L band EDFA $20_L$ are connected in parallel to each other as the construction on the EDFA side. Therefore, the input light power target value is set for each band in such a manner as to correspond to noise characteristics of the C band EDFA $20_C$ and noise characteristics of the L band EDFA $20_L$, respectively.

When the target value corresponding to each band is thus set, the driving condition of each excitation light source $10_1$ to $10_3$ is controlled by the computing controlling section 40 so that input light power of the C band EDFA $20_C$ and the L band EDFA $20_L$ coincide with the respective target values. Here, a feedback control is performed, too, by referring to actual input light power for each band obtained by the monitors $32_C$, $32_L$.

Figure 7B:
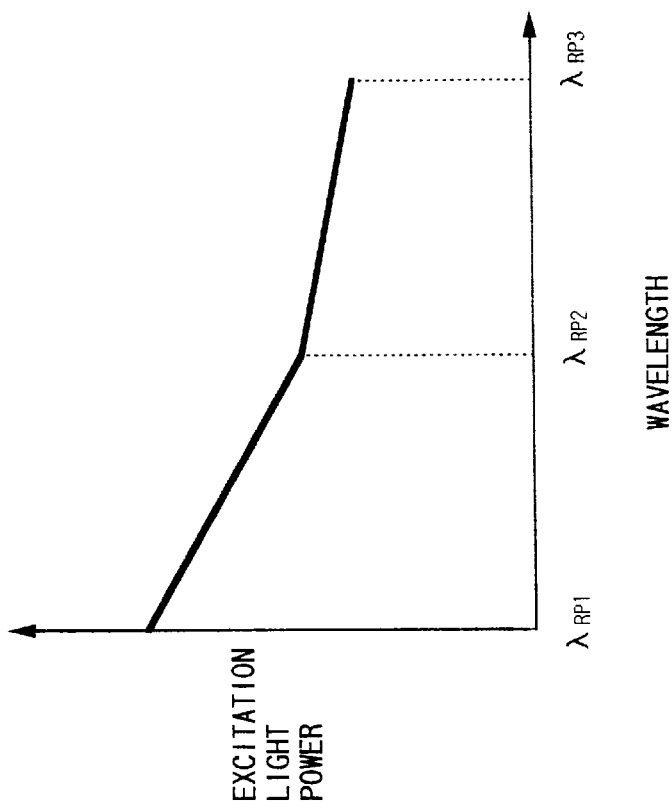
FIG. 7 is a diagram for explaining the calculation of an SRS tilt and the initial value setting of a Raman excitation light power ratio in the second embodiment of the present invention.
Figure 7A:
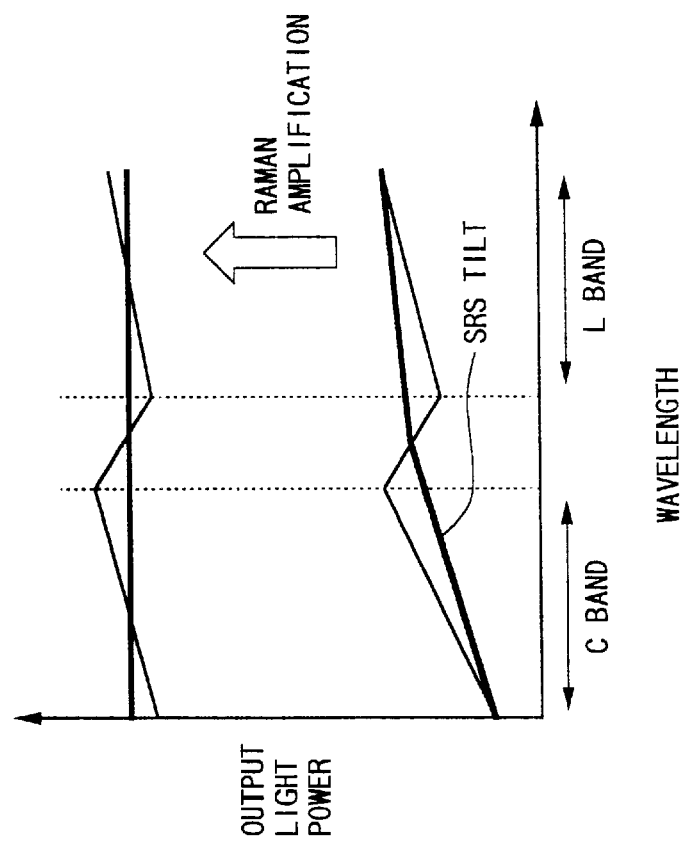

Incidentally, the computing controlling section 40 preferably has an additional function of computing a so-called "SRS tilt" and setting an initial value of an output light power ratio of each excitation light source $10_1$ to $10_3$. Computation of the SRS tilt is to roughly compute a difference of gain tilt of WDM signal light that occurs in accordance with differences in the number of channels and an arrangement (number and arrangement of optical signals of each wavelength) contained in C and L band WDM signal light. When the occurrence of the SRS tilt shown at the lower part of FIG. 7A, for example, is computed before Raman amplification (with excitation light OFF), the initial value of the output light power ratio of each excitation light source $10_1$ to $10_3$ is set by generating distributed Raman amplification in the transmission path so that the wavelength characteristics become flat as shown at the upper part of FIG. 7A. Setting of the initial value in this case is performed such that the excitation light power ratio of each wavelength $\lambda_{RP1}$ to $\lambda_{RP3}$ providing gain wavelength characteristics shown in FIG. 7B, for example, is obtained to set the initial value. Computation of such an SRS tilt and setting of the initial value of the output light power ratio of each excitation light source $10_1$ to $10_3$ are conducted at the time of initial activation or restoration from the shutdown condition of the optical amplification apparatus. Therefore, setting of the input light power target value to the EDFA is conducted, after setting of the initial value of output power ratio of each excitation light source $10_1$ to $10_3$ has been completed and then WDM signal light having flat wavelength characteristics can be obtained.

According to the second embodiment described above, the noise components resulting from Raman amplification can be computed in accordance with the equations ($1_C$) and ($1_L$) described above by monitoring power of Raman excitation light having each wavelength, in the construction that generates Raman excitation light by combining a plurality of excitation light sources $10_1$ to $10_3$ having mutually different wavelengths. Therefore, the second embodiment can obtain effects similar to the effects of the first embodiment. In the construction in which the EDFA $20_C$ and $20_L$ corresponding to the C and L bands, respectively, are connected in parallel, the input light power target value is set so as to correspond to the noise characteristics of the EDFA $20_C$, $20_L$ of each band. In this way, the noise figure of the overall apparatus can be reduced to minimum. Furthermore, when the SRS tilt is computed to set the initial value of the output power ratio of each excitation light source $10_1$ to $10_3$, it becomes possible to realize an optical amplification apparatus having superior amplification characteristics.

In the first and second embodiments described above, a part of Raman excitation light output from the front of the excitation light source is branched by the optical coupler and is then monitored. However, it is also possible to monitor light output from the back of the excitation light source (output of back-power PD in the case of LD). When a plurality of excitation light sources are utilized as in the second embodiment, it is further possible to branch a part of Raman excitation light multiplexed by the WDM coupler 16, and to demultiplex this branched light into each wavelength component by an optical filter having a narrow band, thereby monitoring its optical power.

INDUSTRIAL APPLICABILITY

The present invention has large industrial applicability to optical amplification apparatus used in various optical communication systems and a controlling method of the optical amplification apparatus, and, in particular, is effective for the improvement of noise characteristics of optical amplification apparatus for amplifying signal light by the combination with a Raman amplifier and also effective as a controlling technology for achieving such an improvement.

What is claimed:

1. An optical amplification apparatus utilizing Raman amplification comprising:
   first optical amplifying means for Raman amplifying signal light propagated through a Raman amplification medium by supplying excitation light to said Raman amplification medium; and
   second optical amplifying means for amplifying the signal light output from said first optical amplifying means,
   wherein said optical amplification apparatus further comprises:

target value setting means for setting a target value for minimizing a noise figure of the overall optical amplification apparatus as to input light power of said second optical amplifying means; and excitation light controlling means for controlling an excitation light supply condition of said first optical amplifying means in accordance with the target value set by said target value setting means.

2. An optical amplification apparatus according to claim 1, wherein said target value setting means includes an excitation light power detecting section for detecting excitation light power supplied to said Raman amplification medium, and a computing section for computing noise light power by said first optical amplifying means in accordance with a detection result of said excitation light power detecting section, and setting an input light power target value of said second optical amplifying means for minimizing the noise figure of the overall optical amplification apparatus on the basis of said computed noise light power and on the basis of noise characteristics of said second optical amplifying means.

3. An optical amplification apparatus according to claim 1, wherein said target value setting means sets a maximum value of input dynamic range of said second optical amplifying means to the input light power target value of said second optical amplifying means.

4. An optical amplification apparatus according to claim 3, wherein when excitation light power of said first optical amplifying means reaches a maximum value before the input light power of said second optical amplifying means reaches the maximum value of said input dynamic range, said target value setting means sets the input light power target value of said second optical amplifying means so as to correspond to the maximum value of excitation light power of said first optical amplifying means.

5. An optical amplification apparatus according to claim 1, further comprising;

input light power detecting means for detecting the input light power of said second optical amplifying means, wherein said excitation light controlling means controls the excitation light supply condition of said first optical amplifying means so that a detection result of said input light power detecting means coincides with the target value set by said target value setting means.

6. An optical amplification apparatus according to claim 1, wherein when said second optical amplifying means includes a plurality of optical amplifying sections connected in parallel with one another, said excitation light controlling means sets an input light power target value corresponding to each of said optical amplifying sections.

7. An optical amplification apparatus according to claim 1, wherein said second optical amplifying means includes an optical fiber amplifier using a fiber doped with a rare earth element.

8. An optical amplification method comprising:

a first optical amplifying process of Raman amplifying signal light propagated through a Raman amplification medium by supplying excitation light to said Raman amplification medium; and a second optical amplifying process of amplifying the signal light output from said first optical amplifying process, wherein a target value for minimizing a noise figure of the overall optical amplification method as to input light power of said second optical amplifying process is set and an excitation light supply condition of said first optical amplifying process is controlled in accordance with said target value.

9. An optical amplification apparatus comprising:

a first optical amplifier Raman amplifying signal light propagated through a Raman amplification medium by supplying excitation light to said Raman amplification medium;

a second optical amplifier amplifying the signal light output from said first optical amplifier;

a target value setting unit setting a target value for minimizing a noise figure of the overall optical amplification apparatus as to input light power of said second optical amplifier; and an excitation light controller controlling an excitation light supply condition of said first optical amplifier in accordance with the target value set by said target value setting unit.

10. An optical amplification apparatus according to claim 9, wherein said target value setting unit includes an excitation light power detecting section detecting excitation light power supplied to said Raman amplification medium, and a computing section computing noise light power by said first optical amplifier in accordance with a detection result of said excitation light power detecting section, and setting an input light power target value of said second optical amplifier for minimizing the noise figure of the overall optical amplification apparatus on the basis of said computed noise light power and on the basis of noise characteristics of said second optical amplifier.

11. An optical amplification apparatus according to claim 9, wherein said target value setting unit sets a maximum value of input dynamic range of said second optical amplifier to the input light power target value of said second optical amplifier.

12. An optical amplification apparatus according to claim 11, wherein when excitation light power of said first optical amplifier reaches a maximum value before the input light power of said second optical amplifier reaches the maximum value of said input dynamic range, said target value setting unit sets the input light power target value of said second optical amplifier so as to correspond to the maximum value of excitation light power of said first optical amplifier.

13. An optical amplification apparatus according to claim 9, further comprising;

an input light power detector detecting the input light power of said second optical amplifier, wherein said excitation light controller controls the excitation light supply condition of said first optical amplifier so that a detection result of said input light power detector coincides with the target value set by said target value setting unit.

14. An optical amplification apparatus according to claim 9, wherein when said second optical amplifier includes a plurality of optical amplifying sections connected in parallel with one another, said excitation light controller sets an input light power target value corresponding to each of said optical amplifying sections.

15. An optical amplification apparatus according to claim 9, wherein said second optical amplifier includes an optical fiber amplifier using a fiber doped with a rare earth element.

16. An apparatus comprising:

a first optical amplifier comprising a Raman amplification medium supplied with excitation light so that a signal light is amplified by Raman amplification as the signal light travels through the Raman amplification medium, to thereby output a Raman amplified signal light from the first optical amplifier;

a second optical amplifier receiving the Raman amplified signal light output from the first optical amplifier, and amplifying the received Raman amplified signal light;

a target value setting unit setting a target value of a power of the Raman amplified signal light as received by the second optical amplifier to minimize a total noise figure of the first and second optical amplifiers taken together; and a controller controlling the excitation light supplied to the Raman amplification medium of the first optical amplifier in accordance with the target value set by the target value setting unit.

17. An apparatus according to claim 16, wherein the target value setting unit includes a detector detecting excitation light power of the excitation light supplied to the Raman amplification medium, and a computing section computing noise light power by the first optical amplifier in accordance with a detection result to the detector, and setting the target value on the basis of said computed noise light power and on the basis of noise characteristics of the second optical amplifier.

18. An apparatus according to claim 16, wherein the target value setting unit sets a maximum value of input dynamic range of the second optical amplifier to the target value.

19. An apparatus according to claim 18, wherein when excitation light power of the excitation light supplied to the Raman amplification medium reaches a maximum value before the power of the Raman amplified signal light as received by the second optical amplifier reaches the maximum value of the input dynamic range, the target value setting unit sets the target value so as to correspond to the maximum value of excitation light power of the excitation light supplied to the Raman amplification medium.

20. An apparatus according to claim 16, further comprising:

a detector detecting the power of the Raman amplified signal light as received by the second optical amplifier, wherein the controller controls the excitation light supplied to the Raman amplification medium so that a detection result of the detector coincides with the target value set by said target value setting unit.

21. An apparatus according to claim 16, wherein the second optical amplifier includes a plurality of optical amplifying sections connected in parallel with one another, and the controller sets a target value corresponding to each of the optical amplifying sections.

22. An apparatus according to claim 16, wherein the second optical amplifier is an optical fiber amplifier using a fiber doped with a rare earth element.

23. An apparatus comprising:

a first optical amplifier comprising a Raman amplification medium supplied with excitation light so that a signal light is amplified by Raman amplification as the signal light travels through the Raman amplification medium, to thereby output a Raman amplified signal light from the first optical amplifier;

a second optical amplifier receiving the Raman amplified signal light output from the first optical amplifier, and amplifying the received Raman amplified signal light; and a controller controlling the excitation light supplied to the Raman amplification medium of the first optical amplifier so that the Raman amplified signal light as received by the second optical amplifier is at a power level which causes a total noise figure of the first and second optical amplifiers, taken together, to be minimized.

24. An apparatus comprising:

a Raman amplification medium supplied with excitation light so that a signal light amplified by Raman amplification as the signal light travels through the Raman amplification medium, to thereby output a Raman amplified signal light from the Raman amplification medium;

an optical amplifier receiving the Raman amplified signal light output from the Raman amplification medium, and amplifying the received Raman amplified signal light; and a controller controlling the excitation light supplied to the Raman amplification medium so that the Raman amplified signal light as received by said optical amplifier is at a power level which causes a total noise figure due to amplification in the Raman amplification and said optical amplifier, taken together, to be minimized.

25. An apparatus comprising:

a first optical amplifier comprising a Raman amplification medium supplied with excitation light so that a signal light is amplified by Raman amplification as the signal light travels through the Raman amplification medium, to thereby output a Raman amplified signal light from the first optical amplifier;

a second optical amplifier receiving the Raman amplified signal light output from the first optical amplifier, and amplifying the received Raman amplified signal light; and means for controlling the excitation light supplied to the Raman amplification medium of the first optical amplifier so that the Raman amplified signal light as received by the second optical amplifier is at a power level which causes a total noise figure of the first and second optical amplifiers, taken together, to be minimized.

* * * * *